(12) United States Patent
Yang et al.

(10) Patent No.: US 12,146,274 B2
(45) Date of Patent: Nov. 19, 2024

(54) INTELLIGENT VEHICLE CAPTURING APPARATUS AND METHOD FOR HIGH-PIER BRIDGE

(71) Applicant: SHANDONG UNIVERSITY, Shandong (CN)

(72) Inventors: Zeying Yang, Jinan (CN); Weisong Qu, Jinan (CN); Qianyi Yang, Jinan (CN); Cuiping Qu, Jinan (CN); Fengjin Zhao, Jinan (CN); Tianmin Wang, Jinan (CN); Da Zhang, Jinan (CN); Peng Zhang, Jinan (CN); Liqiang Gao, Shandong (CN); Huiqin Zhang, Jinan (CN); Jie Liu, Jinan (CN); Gongfeng Xin, Jinan (CN); Chuanchang Xu, Jinan (CN); Yangchun Wang, Jinan (CN); Naixuan Ma, Jinan (CN); Li Tian, Jinan (CN); Hetao Hou, Jinan (CN); Ke Wu, Jinan (CN); Yinglin Sun, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 664 days.

(21) Appl. No.: 17/440,940

(22) PCT Filed: Sep. 20, 2021

(86) PCT No.: PCT/CN2021/079906
§ 371 (c)(1),
(2) Date: Sep. 20, 2021

(87) PCT Pub. No.: WO2022/160418
PCT Pub. Date: Aug. 4, 2022

(65) Prior Publication Data
US 2023/0098897 A1   Mar. 30, 2023

(30) Foreign Application Priority Data

Jan. 27, 2021   (CN) .......................... 202110110610.7

(51) Int. Cl.
*E01D 19/00* (2006.01)
*E01F 15/14* (2006.01)
(Continued)

(52) U.S. Cl.
CPC ............ *E01D 19/00* (2013.01); *E01F 15/146* (2013.01); *G01S 13/867* (2013.01); *G01S 13/931* (2013.01)

(58) Field of Classification Search
CPC ........ E01D 19/00; E01F 15/146; E01F 15/02; E01F 15/06
See application file for complete search history.

(56) References Cited

U.S. PATENT DOCUMENTS

| 2002/0085880 A1* | 7/2002 | Schneider ............. E01F 15/146 404/6 |
| 2009/0035068 A1* | 2/2009 | Terai ........................ B63G 9/04 405/211 |

(Continued)

FOREIGN PATENT DOCUMENTS

| CN | 203295961 U | 11/2013 |
| CN | 107038895 A | 8/2017 |

(Continued)

OTHER PUBLICATIONS

Sep. 22, 2021 International Search Report issued in International Application No. PCT/CN2021/079906.

(Continued)

*Primary Examiner* — Abigail A Risic
(74) *Attorney, Agent, or Firm* — Oliff PLC

(57) ABSTRACT

An intelligent vehicle capturing apparatus for a high-pier bridge includes: a double-layer metal protective net; and a (Continued)

support unit and an actuation unit connected to the double-layer metal protective net. The double-layer metal protective net is mounted to a backside of the high-pier bridge through the support unit. The actuation unit includes a hydraulic link mechanism. The hydraulic link mechanism is connected to one end of the double-layer metal protective net. The hydraulic link mechanism is moved to unwind the double-layer metal protective net on the backside of the high-pier bridge to capture a vehicle. In this way, the apparatus stops and buffers a vehicle that is about to rush out of a high-pier bridge.

9 Claims, 4 Drawing Sheets

(51) Int. Cl.
*G01S 13/86* (2006.01)
*G01S 13/93* (2020.01)
*G01S 13/931* (2020.01)

(56) References Cited

U.S. PATENT DOCUMENTS

| | | | | |
|---|---|---|---|---|
| 2013/0126810 | A1* | 5/2013 | Wynnytsky | E01F 15/145 |
| | | | | 256/13.1 |
| 2014/0312289 | A1* | 10/2014 | Harris | E01F 15/06 |
| | | | | 29/428 |
| 2020/0224449 | A1* | 7/2020 | Brock | E01F 15/146 |
| 2020/0340196 | A1* | 10/2020 | Gaik | E01F 15/06 |

FOREIGN PATENT DOCUMENTS

| | | | | |
|---|---|---|---|---|
| CN | 109224338 | A | | 1/2019 |
| CN | 208533364 | U | | 2/2019 |
| CN | 109518592 | A | | 3/2019 |
| CN | 112211100 | A | * | 1/2021 |
| CN | 114775421 | A | * | 7/2022 ........... E01D 19/103 |

OTHER PUBLICATIONS

Sep. 22, 2021 Written Opinion issued in International Patent No. PCT/CN2021/079906.

* cited by examiner

INTELLIGENT VEHICLE CAPTURING APPARATUS AND METHOD FOR HIGH-PIER BRIDGE

TECHNICAL FIELD

The present disclosure belongs to the technical field of bridge safety protection, and in particular, to an intelligent vehicle capturing apparatus and method for a high-pier bridge.

BACKGROUND

The description in this section merely provides background information related to the present disclosure, and does not necessarily constitute the prior art.

With the development of economy, requirements for road traffic become increasingly high. The construction of high-pier bridges cases traffic pressure and increases the speed of vehicle traffic. However, a probability that traffic accidents occur is also increased. Most of the vehicles on a high-pier bridge travel faster, and accidents such as vehicles crashing into a guardrail of the high-pier bridge and vehicles rushing out of the high-pier bridge occur from time to time. This may pose a serious threat to the vehicle itself and the life of a driver, and the vehicle rushing out of the high-pier bridge is likely to crash into the vehicles and pedestrians under the high-pier bridge. At present, there are fewer protective devices to prevent vehicles from rushing out of the high-pier bridge, and single-layer metal nets are mostly provided, which has poor protection and buffering effects.

SUMMARY

In order to resolve the above problems, the present disclosure provides an intelligent vehicle capturing apparatus and method for a high-pier bridge. The apparatus is disposed on the high-pier bridge, which can automatically recognize a vehicle that is about to crash into a guardrail on the high-pier bridge or rush out of the high-pier bridge, and a double-layer metal protective net is actively set up to prevent the vehicle from falling to hit pedestrians and vehicles below after rushing out of the high-pier bridge. In addition, the apparatus can act as a buffer and consume kinetic energy of the vehicle.

In a first aspect, the present disclosure provides an intelligent vehicle capturing apparatus for a high-pier bridge, including: a double-layer metal protective net; and
  a support unit and an actuation unit connected to the double-layer metal protective net, where
  the double-layer metal protective net is mounted to a backside of the high-pier bridge through the support unit, and
  the actuation unit includes a hydraulic link mechanism, the hydraulic link mechanism is connected to one end of the double-layer metal protective net, and the hydraulic link mechanism is moved to unwind the double-layer metal protective net on the backside of the high-pier bridge to capture a vehicle.

In a second aspect, the present disclosure provides a method of use of an intelligent vehicle capturing apparatus for a high-pier bridge, the method including:
  winding a double-layer metal protective net through a rolling shaft of a support unit, and mounting the double-layer metal protective net to a backside of a high-pier bridge; and
  driving, by a hydraulic link mechanism, the double-layer metal protective net on the backside of the high-pier bridge to move along a set trajectory to unwind the double-layer metal protective net when a vehicle is about to crash into a guide rail and rush out of the high-pier bridge, so as to capture, stop and buffer the vehicle.

In comparison to the prior art, the present disclosure has the following beneficial effects.

1. In the present disclosure, the hydraulic link mechanism is connected to one end of the double-layer metal protective net. The hydraulic link mechanism is moved to unwind the double-layer metal protective net on the backside of the high-pier bridge to capture a vehicle, and a double-layer metal protective net that is wound and placed on the backside of the high-pier bridge is stretched out and unwound, so that the apparatus stops and buffers a vehicle that is about to rush out of the high-pier bridge. Upon completion of operation, a hydraulic system can be controlled to operate to drive a third hydraulic cylinder in a support rod on the backside of the high-pier bridge to drive a rolling shaft to rotate to wind and place a double-layer metal protective net on the backside of the high-pier bridge. The apparatus has a simple structure that is practical and easy to use. The apparatus can be used on highly hazardous road sections on high-pier bridges to protect vehicle passengers and avoid serious traffic accidents as a result of vehicles rushing out of surfaces of the high-pier bridges.

2. In the present disclosure, a vehicle that is about to crash into a guardrail on a high-pier bridge is recognized by using a radar sensing device, and a double-layer metal protective net is actively set up to prevent the vehicle from causing serious injury to the vehicle and the driver and falling to hit pedestrians and vehicles below after rushing out of the high-pier bridge. In addition, the apparatus can act as a buffer, consume kinetic energy of the vehicle, reduce the degree of destroying, and reduce or avoid casualties.

3. In the present disclosure, the adopted double-layer metal protective net is arranged uniformly by sandwiching a certain number of springs in the middle of a two-layer metal protective net to form an entirety. Compared with the conventional single-layer metal protective net, the double-layer metal protective net is sturdy and impact-resistant and has a stronger buffering effect. The double-layer metal protective net has a stronger buffer capacity than the conventional single-layer protective net. The double-layer metal protective net is wound and placed under the high-pier bridge when in a non-operating state to reduce the impact of rain erosion on the double-layer metal protective net.

The additional aspects and advantages of the present disclosure will be provided in the following description, some of which will become apparent from the following description or may be learned from practices of the present disclosure.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

In the figure: 1. support rod, 2. hydraulic unit, 3. control unit, 4. double-layer metal protective net, 5. high-definition camera, 6. radar sensing device, 7. second link, 8. support frame, 9. pulley, 10. first hydraulic cylinder, 11. second hydraulic cylinder, 12. third hydraulic cylinder.

DETAILED DESCRIPTION

The present disclosure is further described below with reference to the accompanying drawings and embodiments.

It should be noted that, the following detailed descriptions are all exemplary, and are intended to provide further descriptions of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Embodiment 1

Figure 1:
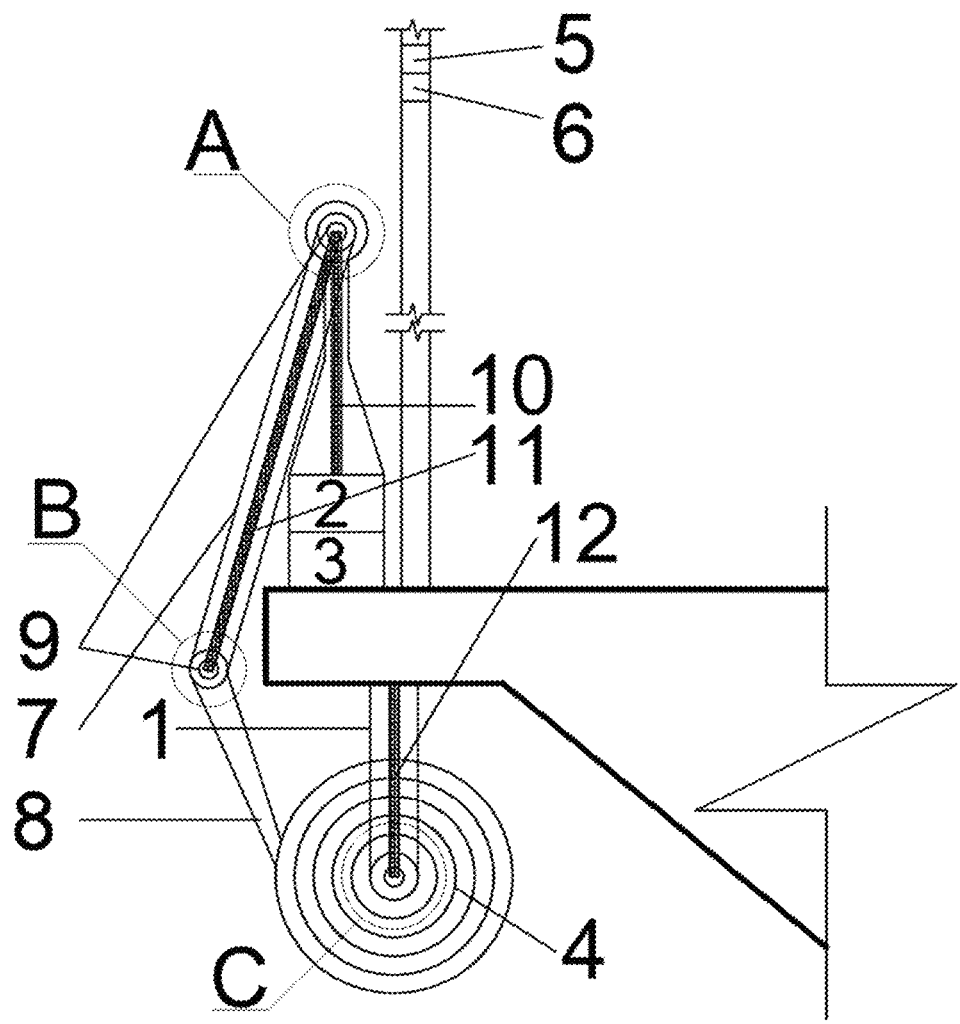
FIG. 1 is a schematic diagram of an intelligent vehicle capturing apparatus for a high-pier bridge according to the present disclosure.
Figure 1A:
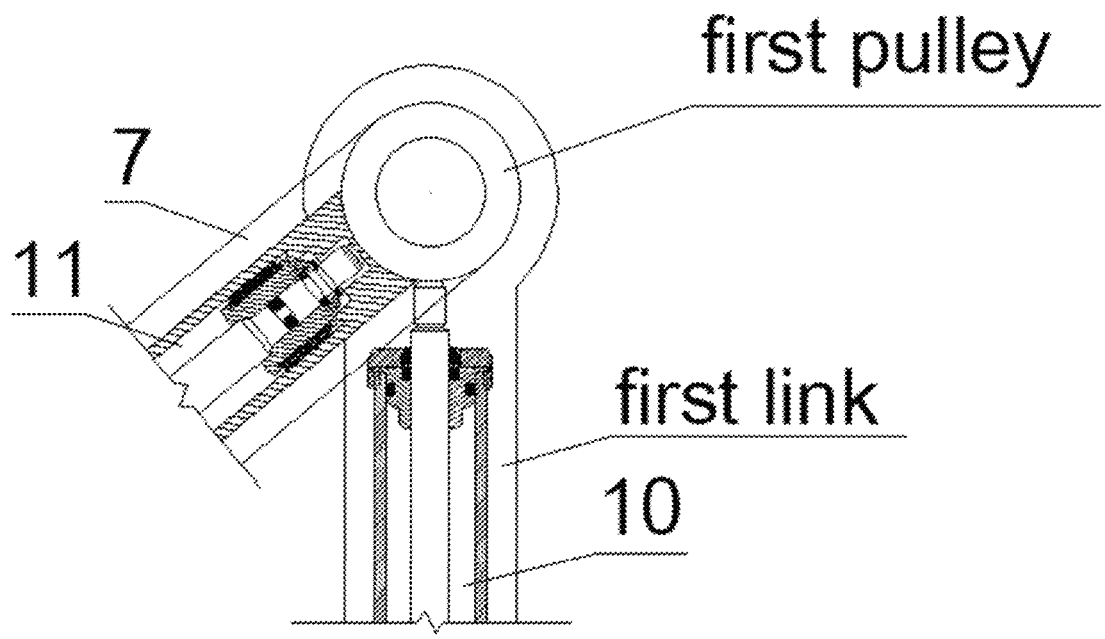
FIG. 1A is a partially enlarged schematic diagram of area A in FIG. 1.
Figure 1B:
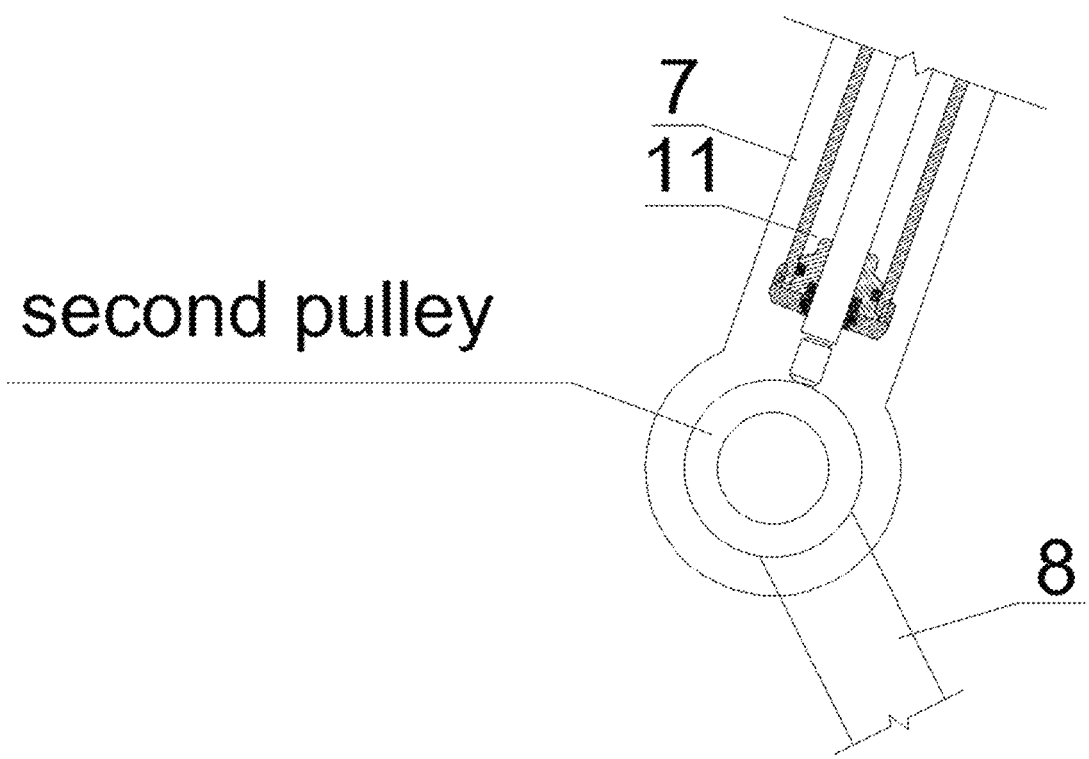
FIG. 1B is a partially enlarged schematic diagram of area B in FIG. 1.
Figure 1C:
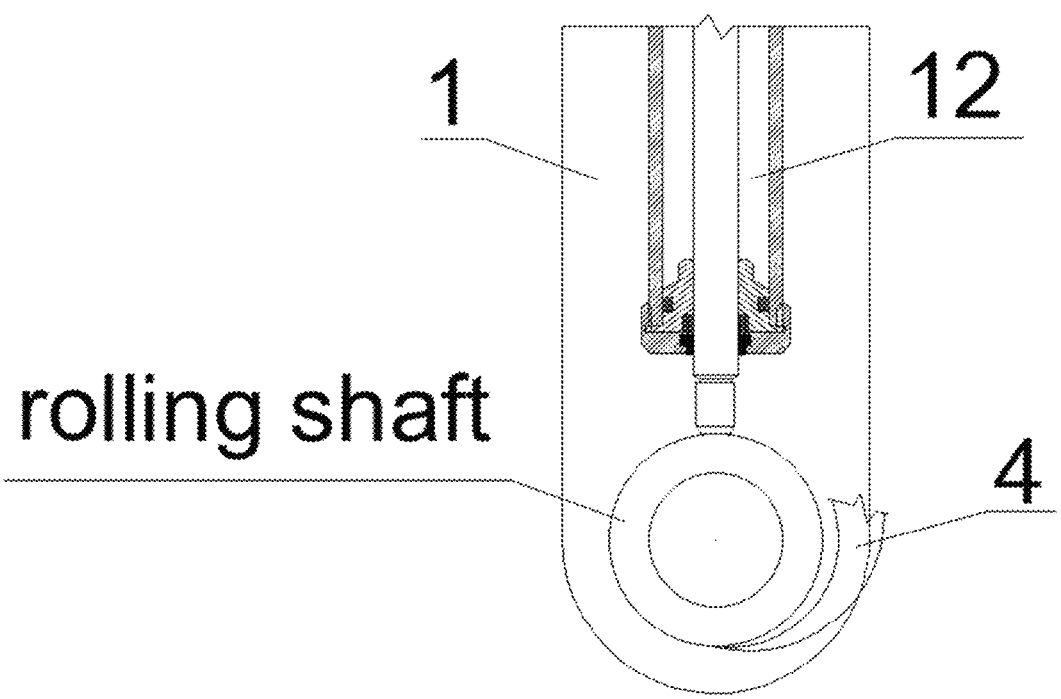
FIG. 1C is a partially enlarged schematic diagram of area C in FIG. 1.
Figure 2:
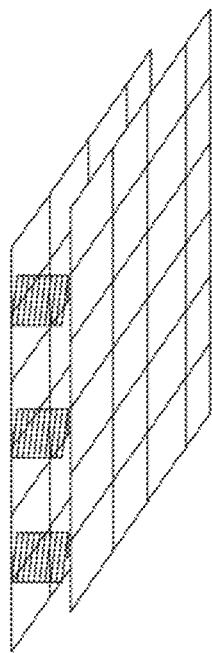
FIG. 2 is a schematic diagram of a double-layer metal protective net of the intelligent vehicle capturing apparatus for a high-pier bridge according to the present disclosure.
Figure 3:
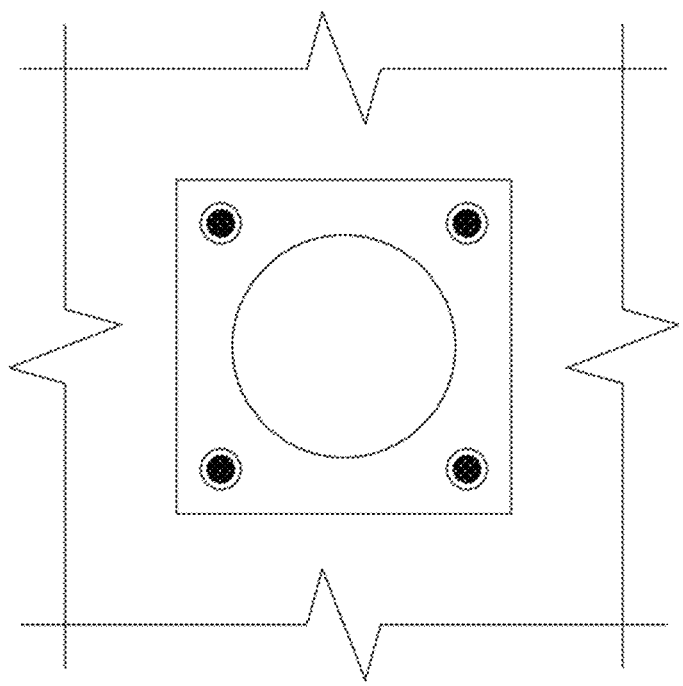
FIG. 3 is a schematic diagram of connection of the double-layer metal protective net to an entire high-pier bridge by using steel tube bolts of the intelligent vehicle capturing apparatus for a high-pier bridge according to the present disclosure.

As shown in FIG. 1, an intelligent vehicle capturing apparatus for a high-pier bridge is provided. The apparatus includes: a double-layer metal protective net; and a support unit and an actuation unit connected to the double-layer metal protective net, where the double-layer metal protective net is mounted to a backside of the high-pier bridge through the support unit; and the actuation unit includes a hydraulic link mechanism, the hydraulic link mechanism is connected to one end of the double-layer metal protective net, and the hydraulic link mechanism is moved to unwind the double-layer metal protective net on the backside of the high-pier bridge to capture, stop and buffer the vehicle.

Further, the apparatus further includes a detection unit and a control unit, where the detection unit includes a radar sensing device and an image collection device that are configured to collect a signal of a vehicle on a road surface over the high-pier bridge and transmit the signal to the control unit in real time, and the control unit is configured to receive and process the signal of the vehicle to generate an instruction signal and transmit the instruction signal to the actuation unit to control an action of the actuation unit. Specifically, the detection unit and the control unit may be mounted inside a guardrail on a top face of the high-pier bridge.

Further, the actuation unit further includes a hydraulic system, the hydraulic system is connected to a hydraulic link mechanism through a hydraulic oil circuit to control an action of the hydraulic link structure by controlling hydraulic oil. The control unit is connected to the hydraulic system of the actuation unit. Specifically, a power element in the hydraulic system adopts a diesel engine, accepts instructions, and starts operating. The diesel engine converts chemical energy of a diesel to mechanical energy, and then converts the mechanical energy to hydraulic energy through a hydraulic pump. An actuating element is a hydraulic cylinder that is connected to a pulley to drive the overall operation of the actuating element.

Further, the hydraulic link mechanism further includes a first link, a second link, and a support frame connected in sequence. The first link is connected to one end of the second link through a first pulley, an other end of the second link is connected to one end of the support frame through a second pulley, and an other end of the support frame is connected to the double-layer metal protective net. A first hydraulic cylinder is provided in the first link, the first hydraulic cylinder is connected to the first pulley to drive the first pulley to rotate by a set angle. A second hydraulic cylinder is provided in the second link, and the second hydraulic cylinder is connected to the second pulley to drive the second pulley to rotate by a set angle. The first link is mounted to a top face of the high-pier bridge and is specifically disposed in a guide rail of the high-pier bridge, and the second link is disposed across one end of the high-pier bridge. The first link, the second link, the support frame, the double-layer metal protective net, and the support unit are connected in sequence with the surface of the high-pier bridge to form a ring shape.

Specifically, the first link is a first steel tube or a guardrail body of the high-pier bridge, the second link is a second steel tube, and the third link is a third steel tube. First, the hydraulic link mechanism drives a first hydraulic cylinder of the first steel tube in the guide rail of the high-pier bridge to cause the first pulley to rotate, and the first pulley is rotated to drive the second steel tube to rotate about the first pulley. The second hydraulic cylinder in the second steel tube 7 drives the second steel tube 7 and the second pulley of the support frame 8 to rotate, the second pulley is rotated to drive the support frame 8 to rotate, the support frame 8 and the second steel tube 7 are rotated and prop up upwards, and the double-layer metal protective net that is wound and placed at the bottom of the high-pier bridge is stretched out and unwound to block and buffer the vehicle that is about to rush out of the high-pier bridge. Upon completion of operation, a hydraulic system can be controlled to operate to drive a third hydraulic cylinder in a support rod on the backside of the high-pier bridge to drive a rolling shaft to rotate to wind and place a double-layer metal protective net on the backside of the high-pier bridge.

Further, the support unit includes a support rod and a rolling shaft, one end of the support rod is fixedly mounted to the backside of the high-pier bridge, and an other end of the support rod is connected to the double-layer metal protective net and the rolling shaft. The rolling shaft is configured to wind the double-layer metal protective net in a non-operating state. The support rod includes a steel rod and a third hydraulic cylinder, the third hydraulic cylinder is mounted in the steel rod, and one end of the third hydraulic cylinder is connected to the rolling shaft to drive the rolling shaft to move to wind or unwind the double-layer metal protective net.

Further, the double-layer metal protective net includes a first metal net, a second metal net, and an elastic member, the first metal net and the second metal net are arranged in parallel, and the first metal net is connected to the second metal net through the elastic member. The elastic member is a spring. Specifically, the double-layer metal protective net is a double-layer metal net, which is connected by a plurality of springs in the middle to form an entire double-layer metal net to enhance its buffering effect.

Further, the double-layer metal protective net is disposed at a lower part of the high-pier bridge and is wound through the rolling shaft in the non-operating state. One end of the rolling shaft is connected to the support rod, and the support rod is fixed to the backside of the high-pier bridge. The rolling shaft is connected to the hydraulic system. Upon completion of the protection, the rolling shaft is driven by using the hydraulic system to wind and retract the double-layer metal protective net.

Embodiment 2

The present disclosure further provides a method of use of an intelligent vehicle capturing apparatus for a high-pier bridge, the method including:

winding a double-layer metal protective net through a rolling shaft of a support unit, and mounting the double-layer metal protective net to a backside of a high-pier bridge; and driving, by a hydraulic link mechanism, the double-layer metal protective net on the backside of the high-pier bridge to move along a set trajectory to unwind the double-layer metal protective net when a vehicle is about to crash into a guide rail and rush out of the high-pier bridge, so as to capture, stop and buffer the vehicle.

Specifically, first, the hydraulic link mechanism drives a first hydraulic cylinder of the first steel tube in the guide rail of the high-pier bridge to cause the first pulley to rotate, and the first pulley is rotated to drive the second steel tube to rotate about the first pulley. The second hydraulic cylinder in the second steel tube 7 drives the second steel tube 7 and the second pulley of the third steel frame 8 to rotate, the second pulley is rotated to drive the support frame 8 to rotate, the support frame 8 and the second steel tube 7 are rotated and prop up upwards, and the double-layer metal protective net that is wound and placed at the bottom of the high-pier bridge is stretched out and unwound to block and buffer the vehicle that is about to rush out of the high-pier bridge. Upon completion of operation, a hydraulic system can be controlled to operate to drive a third hydraulic cylinder in a support rod on the backside of the high-pier bridge to drive a rolling shaft to rotate to wind and place a double-layer metal protective net on the backside of the high-pier bridge.

The foregoing descriptions are merely preferable embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. An intelligent vehicle capturing apparatus for a high-pier bridge, the apparatus comprising: a double-layer metal protective net;
a support unit and an actuation unit connected to the double-layer metal protective net, wherein
the double-layer metal protective net is mounted to a backside of the high-pier bridge through the support unit, and
the actuation unit comprises a hydraulic link mechanism, the hydraulic link mechanism is connected to one end of the double-layer metal protective net, and the hydraulic link mechanism is moved to unwind the double-layer metal protective net on the backside of the high-pier bridge to capture a vehicle; and
a detection unit and a control unit, wherein the detection unit comprises a radar sensing device and an image collection device that are configured to collect a signal of a vehicle on a road surface over a high-pier bridge and transmit the signal to the control unit in real time, and the control unit is configured to receive and process the signal of the vehicle to generate an instruction signal and transmit the instruction signal to the actuation unit to control an action of the actuation unit.

2. The intelligent vehicle capturing apparatus for the high-pier bridge according to claim 1, wherein the actuation unit further comprises a hydraulic system, and the hydraulic system is connected to the hydraulic link mechanism through a hydraulic oil circuit to control an action of the hydraulic link mechanism by controlling hydraulic oil.

3. The intelligent vehicle capturing apparatus for the high-pier bridge according to claim 1, wherein the hydraulic link mechanism comprises a first link, a second link, and a support frame connected in sequence, the first link is connected to one end of the second link through a first pulley, another end of the second link is connected to one end of the support frame through a second pulley, and another end of the support frame is connected to the double-layer metal protective net.

4. The intelligent vehicle capturing apparatus for the high-pier bridge according to claim 3, wherein a first hydraulic cylinder is provided in the first link, the first hydraulic cylinder is connected to the first pulley to drive the first pulley to rotate by a set angle, a second hydraulic cylinder is provided in the second link, and the second hydraulic cylinder is connected to the second pulley to drive the second pulley to rotate by a set angle.

5. The intelligent vehicle capturing apparatus for the high-pier bridge according to claim 4, wherein the first link is mounted to a top face of the high-pier bridge and is disposed inside a guide rail of the high-pier bridge, and the second link is disposed across one end of the high-pier bridge.

6. The intelligent vehicle capturing apparatus for the high-pier bridge according to claim 1, wherein the support unit comprises a support rod and a rolling shaft, one end of the support rod is fixedly mounted to the backside of the high-pier bridge, and another end of the support rod is connected to the double-layer metal protective net and the rolling shaft.

7. The intelligent vehicle capturing apparatus for the high-pier bridge according to claim 6, wherein the support rod comprises a steel tube and a third hydraulic cylinder, the third hydraulic cylinder is mounted in the steel tube, and one end of the third hydraulic cylinder is connected to the rolling shaft to drive the rolling shaft to move to wind or unwind the double-layer metal protective net.

8. The intelligent vehicle capturing apparatus for the high-pier bridge according to claim 1, wherein the double-layer metal protective net comprises a first metal net, a second metal net, and an elastic member, the first metal net and the second metal net are arranged in parallel, and the first metal net is connected to the second metal net through the elastic member.

9. A method of use of an intelligent vehicle capturing apparatus for a high-pier bridge, the method comprising:
    winding a double-layer metal protective net through a rolling shaft of a support unit, and mounting the double-layer metal protective net to a backside of a high-pier bridge;
    collecting and transmitting, by a radar sensing device and an image collection device, a signal of a vehicle on a road surface over a high-pier bridge to a control unit in real-time;
    generating and transmitting, by the control unit, an instruction signal after receiving and processing the signal of the vehicle, and to an actuation unit to control an action of a hydraulic link mechanism; and
    driving, by the hydraulic link mechanism, the double-layer metal protective net on the backside of the high-pier bridge to move along a set trajectory to unwind the double-layer metal protective net when the vehicle is about to crash into a guide rail and rush out of the high-pier bridge, so as to capture, stop and buffer the vehicle.

* * * * *